(12) United States Patent
Kotwicki

(10) Patent No.: US 6,845,753 B2
(45) Date of Patent: Jan. 25, 2005

(54) SYSTEM AND METHOD FOR CONTROLLING IGNITION TIMING IN AN ENGINE

(75) Inventor: Allan Joseph Kotwicki, Williamsburg, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 10/281,937

(22) Filed: Oct. 29, 2002

(65) Prior Publication Data

US 2004/0079332 A1 Apr. 29, 2004

(51) Int. Cl.[7] ............................... F02P 5/12; F02P 5/14
(52) U.S. Cl. ........................... 123/406.26; 123/406.44; 123/406.55
(58) Field of Search ................. 123/406.26, 406.35, 123/406.44, 406.48, 406.55

(56) References Cited

U.S. PATENT DOCUMENTS

| | | | |
|---|---|---|---|
| 4,424,783 A | | 1/1984 | Kotwicki |
| 4,814,997 A | * | 3/1989 | Matsumura et al. ... 123/406.49 |
| 5,150,300 A | * | 9/1992 | Danno et al. .......... 123/406.55 |
| 5,197,430 A | * | 3/1993 | Hoshiba et al. ........ 123/406.55 |
| 5,309,882 A | * | 5/1994 | Hoshiba et al. ........ 123/339.11 |
| 5,515,833 A | | 5/1996 | Cullen et al. |
| 6,098,602 A | | 8/2000 | Martin et al. |
| 6,505,465 B2 | * | 1/2003 | Kanazawa et al. ..... 123/406.48 |
| 6,598,588 B2 | * | 7/2003 | Yuya ..................... 123/406.55 |

OTHER PUBLICATIONS

Kotwicki et al., An Algorithm To Compensate For Air Charge Prediction Errors, SAE 2000 World Congress, Mar. 6–9, 2000, Detroit, MI (2000–01–0258).

Kotwicki et al., An Air Meter Based Cylinder Air Charge Estimator, International Congress And Exposition, Mar. 1–4, 1999, Detroit, MI (1999–01–0856).

* cited by examiner

*Primary Examiner*—Erick Solis
(74) *Attorney, Agent, or Firm*—Donald J. Lewis; Allan J. Lippa

(57) ABSTRACT

A system and method for controlling ignition timing of an engine is provided. The method includes determining a change in a combustion temperature rise within an engine based on a change in at least one engine operating parameter. The method further includes adjusting the ignition timing of the engine based on the change of combustion temperature rise.

16 Claims, 4 Drawing Sheets

SYSTEM AND METHOD FOR CONTROLLING IGNITION TIMING IN AN ENGINE

FIELD OF THE INVENTION

The invention relates to a system and method for controlling ignition timing in a spark ignited engine.

BACKGROUND OF THE INVENTION

Known engine control systems have utilized various engine parameters to control engine ignition timing. For example, known systems have utilized exhaust gas recirculation (EGR) rate tables, barometric pressure tables, and air-fuel tables to adjust ignition timing. However, each of these engine parameters has been treated independently when controlling ignition timing leading to complex control methods. Thus, for example, if the barometric pressure communicating with a vehicle changes, the effect of the barometric pressure change on a desired or target value for an engine parameter, such as an EGR rate, may be unknown. Thus, an EGR based adjustment to ignition timing that was not calibrated for varying barometric pressure might result in non-optimal ignition timing. Similarly, a barometric pressure based adjustment to ignition timing would not-include the effect of EGR changes. Thus, all these tables might not provide optimal adjustment of ignition timing for varying barometer and EGR conditions.

In an attempt to lessen the impact of previously mentioned problem, automotive manufacturers have calibrated vehicles for either high altitude operation or low altitude operation. A high altitude vehicle may utilize a barometric pressure table to control ignition timing while shutting off EGR, or not use an EGR table for ignition timing adjustment. Thus, a high altitude vehicle may not perform optimally at sea-level when EGR may be desirable. Similarly, a low altitude vehicle utilizing an EGR table may not perform optimally at relatively high altitudes because the affect of barometric pressure on the EGR table may be unknown.

The inventor herein has recognized that there is a need for a simpler and more integrated system and method for controlling ignition timing.

SUMMARY OF THE INVENTION

The foregoing problems and disadvantages are overcome by a system and method for controlling ignition timing in accordance with the present invention.

The inventor herein has recognized that there is a common property of combustion (i.e., a temperature rise during combustion) that is directly related to a combustion rate in an engine cylinder and an optimal ignition timing. The temperature rise during combustion is directly affected by engine operating parameters such as an air-fuel ratio, an exhaust gas recirculation (EGR) rate, and an exhaust gas pressure downstream of an engine cylinder. In particular, the inventor herein has recognized that changes in each of the engine operating parameters can be directly related to changes in the temperature rise during combustion. Thereafter, the ignition timing can be controlled based on that same change in temperature rise—which greatly simplifies the vehicle calibration and ignition control implementation.

The method for controlling ignition timing in accordance with the present invention includes determining a change in a combustion temperature rise within the engine based on a change in at least one engine operating parameter. The engine operating parameters may include one or more of the following: an EGR rate, an air-fuel ratio, and an exhaust gas pressure downstream of an engine cylinder. The method further includes adjusting the ignition timing of the engine based on the change of a combustion temperature rise.

A system for controlling ignition timing in an engine in accordance with the present invention is also provided. The engine includes an intake manifold communicating with an engine cylinder. The system includes a first sensor generating a first signal indicative of an engine operating parameter. The system further includes a controller operably coupled to the first sensor. The controller is configured to determine a change in a combustion temperature rise within the engine based on a change in the engine operating parameter. The controller is further configured to adjust the ignition timing of the engine based on the change of combustion temperature rise.

An advantage of the present invention is that the proposed new ignition control methodology allows vehicles to have optimal ignition timing at either relatively high altitudes or sea-level altitudes. This advantage is obtained because the contribution of changes in an air-fuel ratio, an EGR rate, and an exhaust pressure can simultaneously be directly related to a temperature rise, which is thereafter directly related to an ignition timing value.

A further advantage of the present invention is that improved vehicle fuel economy is obtained due to an optimal work torque being produced by the optimal ignition timing.

DESCRIPTION OF AN EMBODIMENT

Figure 1:
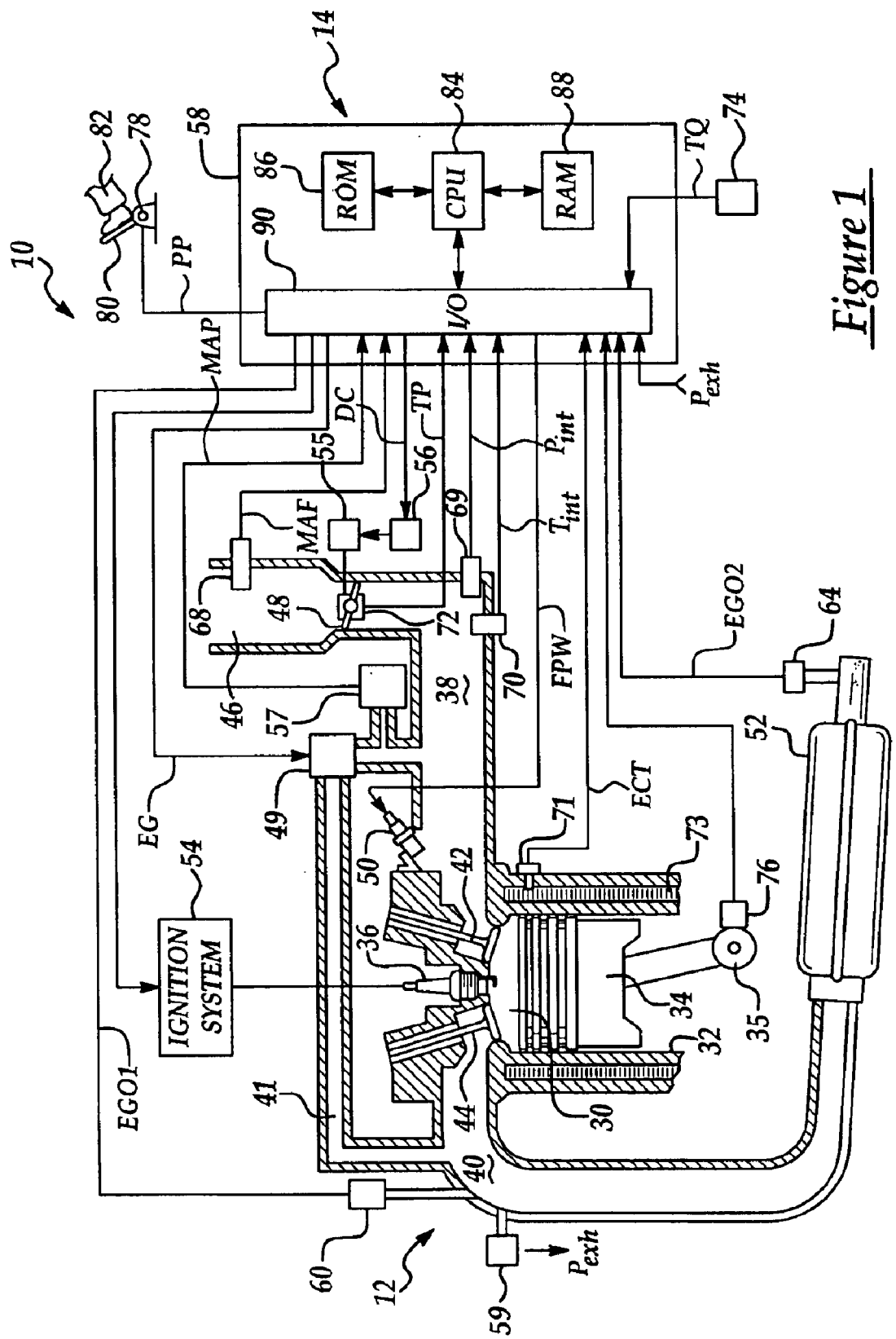
FIG. 1 is block diagram of an automotive vehicle having an engine and an engine control system.

Referring to the drawings, identical reference numerals identify identical components in the various views. Referring to FIG. 1, an automotive vehicle 10 includes an internal combustion engine 12 and an engine control system 14.

Engine 12 may include a plurality of cylinders; however only one cylinder is shown for clarity of illustration. Engine 12 may further include a combustion chamber 30, cylinder walls 32, a piston 34, a crankshaft 35, a spark plug 36, an intake manifold 38, an exhaust manifold 40, an EGR conduit 41, an intake valve 42, an exhaust valve 44, a throttle body 46, a throttle plate 48, an EGR valve 49, a fuel injector 50, and a catalytic converter 52.

Combustion chamber 30 communicates with intake manifold 38 and exhaust manifold 40 via respective intake and exhaust valves 42, 44. Piston 34 is positioned within combustion chamber 30 between cylinder walls 32 and is connected to crankshaft 35. Ignition of an air-fuel mixture within combustion chamber 30 is controlled via spark plug 36 which delivers ignition spark responsive to a signal from an ignition system 54. The control of ignition timing in combustion chamber 30 will be described in greater detail below.

Intake manifold 38 communicates with throttle body 46 via throttle plate 48. Throttle plate 48 is controlled by electric motor 55 which receives a signal from ETC driver 56. ETC driver 56 receives a control signal (DC) from a controller 58. Intake manifold 38 is also shown having fuel injector 50 coupled thereto for delivering fuel in proportion to the pulse width of signals (FPW) from controller 58. Fuel is delivered to fuel injector 50 by a fuel system (not shown) including a fuel tank, fuel pump, and fuel rail (not shown). Although port fuel injection is shown, other methods such as direction fuel injection could be utilized to control fueling.

Exhaust manifold 40 communicates with catalyst 52, respectively, which may comprise a three-way catalytic converter for example. Catalyst 52 reduces exhaust gas constituents such as nitrous oxides (NOx) and oxidizes carbon monoxide (CO) and hydrocarbons (HC).

EGR conduit 41 is provided to recirculate exhaust gases from exhaust manifold 40 to intake manifold 38. Recirculating exhaust gases into the intake air reduces the temperatures reached during combustion which reduces the formation of NOx. Flow of exhaust gases through EGR conduit 41 is controlled by valve 49 disposed within conduit 41. Valve 49 is controlled via signal (EG) generated by controller 58.

Control system 14 is provided to control the operation of engine 12 and to implement a method for controlling ignition timing within cylinders of engine 12. Control system 14 includes an ignition system 54, an electric motor 55 for controlling throttle plate 48, an ETC driver 56, EGR flow sensor 57, exhaust pressure sensor 59, exhaust gas sensors 60, 64, a mass air flow sensor 68, a intake pressure sensor 69, a temperature sensor 70, a throttle position sensor 72, a torque sensor 74, an engine speed sensor 76, a pedal position sensor 78, an accelerator pedal 80, and controller 58.

EGR flow sensor 57 is provided to measure the EGR flow through conduit 41. Sensor 57 is in fluid communication with conduit 41 and generates signal (EG) indicative of an EGR flow rate within conduit 41. Signal (EG) is received by controller 58.

Exhaust pressure sensor 59 is provided to measure the exhaust pressure in manifold 40 due to exhaust gases. In particular, sensor 59 may generate a signal ($P_{exh}$) indicative of the exhaust pressure in manifold 40 that is received by controller 58. Alternately, as discussed below, the exhaust pressure may be inferred from engine operating parameters in lieu of using sensor 59.

Exhaust gas sensor 60 is disposed upstream of catalyst 52 and exhaust gas sensor 64 is disposed downstream of catalyst 52. Exhaust gas sensors 60, 64 may comprise one of an EGO sensor, an HEGO sensor, or a UEGO sensor. Sensor 60 may generate signal EGO1 indicative of an air/fuel ratio in exhaust gases upstream of catalyst 52. Sensor 64 may generate signal EGO2 indicative of an air/fuel ratio in exhaust gases downstream of catalyst 52.

Mass air flow rate sensor 68 generates a signal transmitted to controller 58 indicating the inducted air flow ($\dot{m}_{air}$) rate. Controller 58 can utilize value ($\dot{m}_{air}$) to determine the mass of air ($m_{air}$) inducted per cylinder firing event. Sensor 68 may be coupled to the throttle body 46 or intake manifold 38.

Intake pressure sensor 69 is provided to measure a pressure in intake manifold 38. In particular, sensor 69 may generate a signal ($P_{int}$) indicative of the pressure in manifold 38 that is received by controller 58. Alternately, the intake pressure ($P_{int}$) may be inferred from the air flow rate sensor 68 signal.

Temperature sensor 70 generates a signal ($T_{int}$) that is received by controller 58 indicative of a temperature of intake gases in intake manifold 38.

Temperature sensor 71 generates a signal (ECT) that is received by controller 58 indicative of an engine coolant temperature. Sensor 71 may be coupled to cooling jacket 73 in cylinder wall 32.

Throttle position sensor 72 generates a signal indicating a throttle position (TP) of throttle plate 48 received by controller 58 for closed-loop control of plate 48.

Torque sensor 74 generates a signal (TQ) that may indicate one of following torque values: (i) an engine crankshaft torque, ii) a transmission torque, such as for example, a torque converter turbine torque or a transmission output shaft torque; or (iii) an axle torque.

Engine speed sensor 76 may comprise a Hall effect sensor that generates a signal (N) used to indicate an engine speed. Sensor 76 may be coupled to crankshaft 35 and transmits signal (N) to controller 58.

Accelerator pedal 80 is shown communicating with a driver's foot 82. Pedal position sensor 78 generates a signal indicating acceleration pedal position (PP) that is transmitted to controller 58.

The controller 58 is used to implement the method for controlling ignition timing of engine 12 in accordance with the present invention. The controller 58 includes a microprocessor 84 communicating with various computer-readable storage media. The computer readable storage media preferably include nonvolatile and volatile storage in a read-only memory (ROM) 86 and a random-access memory (RAM) 88. The computer readable media may be implemented using any of a number of known memory devices such as PROMs, EPROMs, EEPROMS, flash memory or any other electric, magnetic, optical or combination memory device capable of storing data, some of which represent executable instructions used by microprocessor 84 in controlling engine 12. Microprocessor 84 communicates with various sensors and actuators (discussed above) via an input/output (I/O) interface 90. Of course, the present invention could utilize more than one physical controller to provide engine/vehicle control depending upon the particular application.

The inventor herein has recognized that changing one or more of the EGR rate, the exhaust pressure ($P_{exh}$), and the air-fuel ratio (AF)—affects the magnitude of a combustion temperature rise in a cylinder. Further, the inventor herein has also recognized that when the change in combustion temperature rise is known, the ignition timing can be adjusted based on the change in combustion temperature rise. Before proceeding with a detailed explanation of the inventive method for adjusting ignition timing, the effect on the combustion temperature rise due to changes to the EGR rate, the exhaust pressure ($P_{exh}$), and the air-fuel ratio will be described.

Residual gases in a cylinder during a combustion event are those gases that resulted from a prior combustion event. In particular, residual gases include both (i) the combusted gases that remain in a cylinder above the TDC piston position (i.e., in a clearance volume of the cylinder) after an exhaust stroke, and (ii) the combusted gases that are expelled into an intake manifold during an intake stroke and subsequently re-inducted into the cylinder during the intake stroke. When residual gases are present in a cylinder, the temperature rise during the combustion event is reduced from a maximum possible temperature rise.

Figure 3:
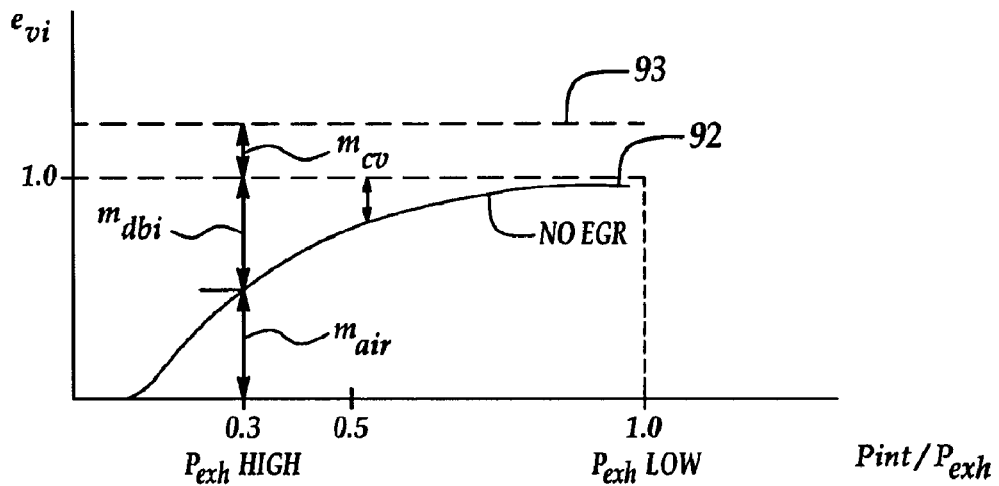
FIGS. 3 and 4 are graphs illustrating the relationship between volumetric efficiency of the engine and an exhaust gas pressure.

Referring to FIG. 3, the effect of a change in an exhaust gas pressure ($P_{exh}$) on both the amount of residual gases in a cylinder and a combustion temperature rise will be explained. FIG. 3 illustrates a diagram of volumetric efficiency ($e_{vi}$) versus the ratio of intake pressure and exhaust pressure ($P_{int}/P_{exh}$). Volumetric efficiency is a ratio of an actual amount of air inducted into a cylinder and a maximum possible amount of air that can be inducted into the cylinder at the same temperature and pressure. The curve 92 corresponds to the mass of air ($m_{air}$) inducted into a cylinder. The curve 92 approaches the value 1.0 as the intake manifold to exhaust pressure ratio approaches 1.0. The area below the line 1.0 and above curve 92 corresponds to residual gases that expand back into the intake manifold and are drawn back in during the intake stroke. The area above the line 1.0 and below dashed line 93 corresponds to residual gas left in the cylinder clearance volume. The area above curve 92 and below dashed line 93 thus corresponds to the amount of residual gases in the cylinder.

In particular, the residual gas amounts include:

$m_{dbi}$—mass of residuals drawn back into an cylinder during an intake stroke (curve 92 to line 1.0);

$m_{cv}$—mass of residuals remaining in a clearance volume of a cylinder during an exhaust stroke (line 1.0 to line 93).

For a given manifold pressure ($P_{int}$) when the exhaust pressure ($P_{exh}$) decreases to a relatively low pressure (e.g., when $P_{int}/P_{exh}$ changes from 0.3 to 1.0)—at relatively high altitudes with respect to sea level—the amount of residual gases decreases. For example, when $P_{int}/P_{exh}$=1.0, the residual gases are primarily residual gases retained in the clearance volume having a mass ($m_{cv}$). As a result of decreasing the amount of residual gases, a combustion temperature rise in the cylinder also increases because there is a smaller mass to heat in the cylinder for a predetermined amount of fuel.

Alternately, again for a given manifold pressure ($P_{int}$) when the exhaust pressure ($P_{exh}$) increases to a relatively high value (e.g., when $P_{int}/P_{exh}$ changes from 1.0 to 0.3)—at relatively low altitudes with respect to sea level—the amount of residual gases increases. For example, when $P_{int}/P_{exh}$=0.3, the residual gases include the sum of residual gases retained in the clearance volume ($m_{cv}$) and residual gases drawn back into the cylinder ($m_{dbi}$). As a result of increasing the amount of residual gases, a combustion temperature rise in the cylinder decreases because there is a greater mass to heat in the cylinder for a predetermined amount of fuel.

Figure 4:
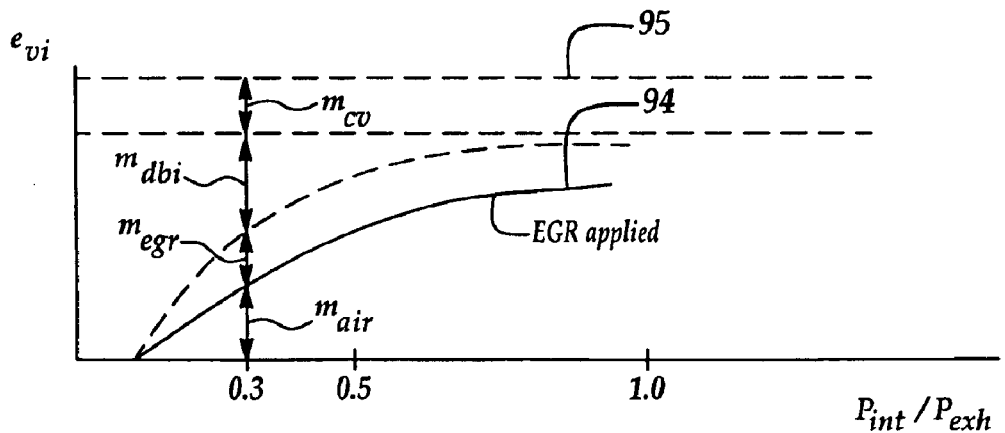

To complete the accounting of all non-combustible gases that affect a combustion temperature rise, a final component (i.e., EGR) must be included. Referring to FIG. 4 which adds the effect of EGR to FIG. 3, the effect of changing an EGR mass ($m_{egr}$) on the amount of residual gases in a cylinder will be explained. As shown, curve 94 corresponds to the volumetric efficiency of a cylinder with EGR being utilized in an engine. The area above curve 92 and below dashed line 95 corresponds to the amount of residual gases in the cylinder. As shown, when EGR is utilized, the residual gases include the sum of residual gases in the clearance volume ($m_{cv}$), the residual gases drawn back into the cylinder ($m_{dbi}$), and the EGR mass ($m_{egr}$). Further, referring to lines 92, 94, the volumetric efficiency (and air mass ($m_{air}$)) decreases when EGR is utilized. Alternately stated, when EGR is not utilized, the amount of residual gases delivered into the cylinder decreases.

Figure 7:
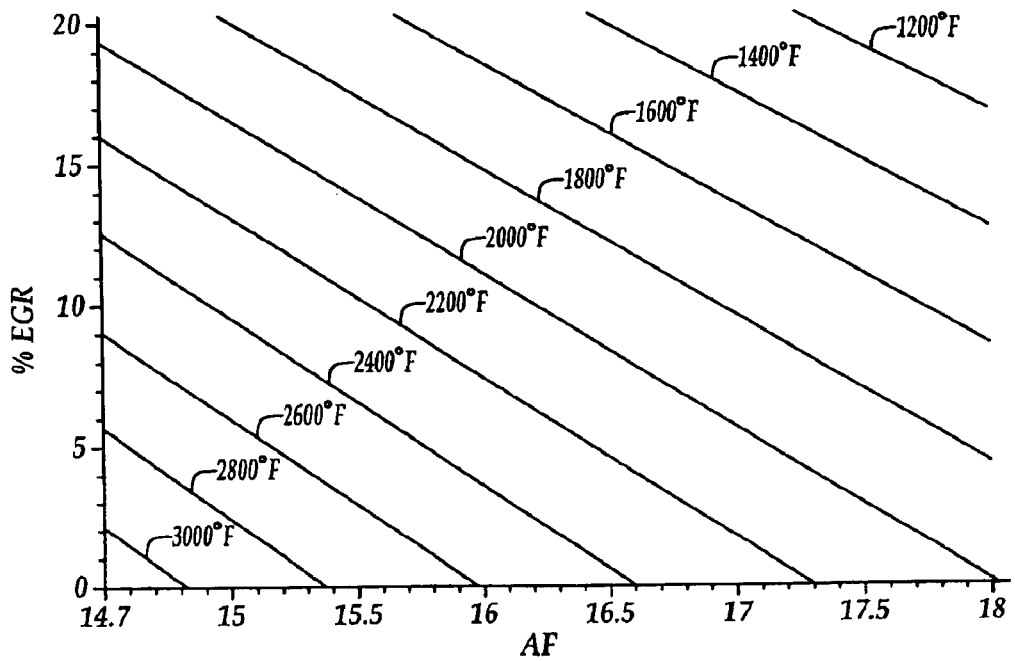
FIG. 7 is a graph illustrating the effect on a combustion temperature rise when changing the amount of EGR and the air-fuel.

Referring to FIG. 7, the effect of changing EGR on a combustion temperature rise in a cylinder will be explained. FIG. 7 is a plot of lines of constant temperature rise as EGR percentage value (% EGR) and air-fuel ratio (AF) are changed. Further, FIG. 7 illustrates how changing the values (% EGR) or (AF) both affect the combustion temperature rise. The EGR percentage value (% EGR) is proportional to the EGR flow rate and is defined by the equation:

$$\% \ EGR = 100 \times \frac{\dot{m}_{egr}}{\dot{m}_{egr} + \dot{m}_{air}}$$

where:

$\dot{m}_{egr}$=EGR mass flow rate, and $\dot{m}_{air}$=air mass flow rate

When the value (% EGR) is increased due to an increase in EGR mass flow rate $\dot{m}_{egr}$ at a constant air flow rate $\dot{m}_{air}$, a corresponding decrease occurs in the combustion temperature rise in the cylinder. For example, as shown in FIG. 7, for an A/F ratio of 14.7 when the (% EGR) increases from 2% to 5%, the combustion temperature rise decreases from 3000° F. to about 2800° F. Alternately, when the (% EGR) value is decreased, the combustion temperature rise in the cylinder increases.

Continuing with FIG. 7, the diagram further illustrates the effect of changing an air-fuel ratio on the combustion temperature rise in a cylinder. As shown, when air-fuel ratio in a cylinder is adjusted leaner the combustion temperature rise is decreased. For example, when (% EGR) is 1% as air-fuel ratio (AF) is increased from 16.5 to 18, the combustion temperature rise decreases from 2400° F. to 2000° F. Alternately, when the air-fuel ratio in the cylinder is adjusted richer the combustion temperature rise is increased. For example, when air-fuel ratio (AF) is decreased from 18 to 16.5 at (% EGR) equal to 1%, the combustion temperature rise increases from 2000° F. to 2400° F.

Figure 6A:
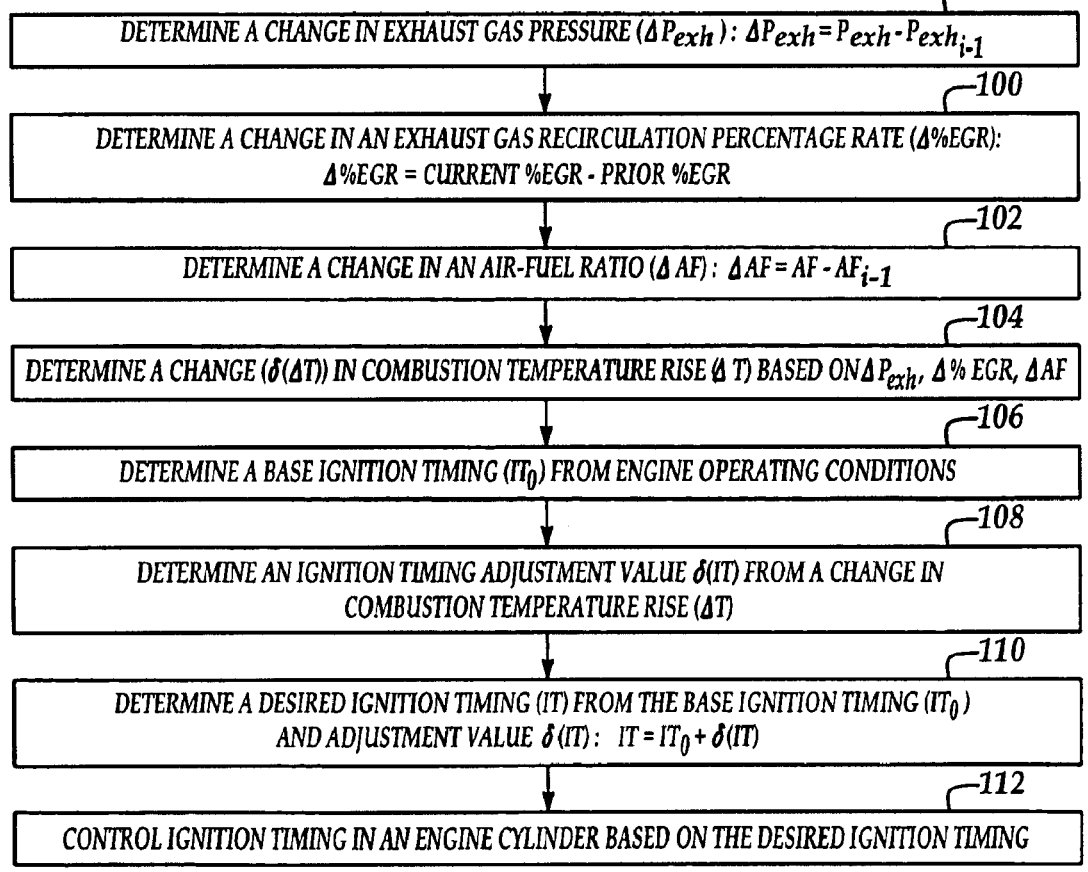
FIGS. 6A–6B are flowcharts of a method to control ignition timing in accordance with the present invention.

Referring to FIG. 6A, a method 96 for adjusting ignition timing in engine 12 based on a change in combustion temperature rise will now be explained.

At step 98, a change in exhaust gas pressure ($\Delta P_{exh}$) is determined utilizing the equation:

$$\Delta P_{exh} = P_{exh} - P_{exh_0}$$

where $P_{exh_0}$ is a base or nominal expected value of exhaust pressure. The current value of exhaust pressure ($P_{exh}$) can be determined using pressure sensor 59 disposed in exhaust manifold 59. Alternately, the exhaust pressure ($P_{exh}$) can be inferred by using steps 114–120 of FIG. 6B.

Figure 6B:
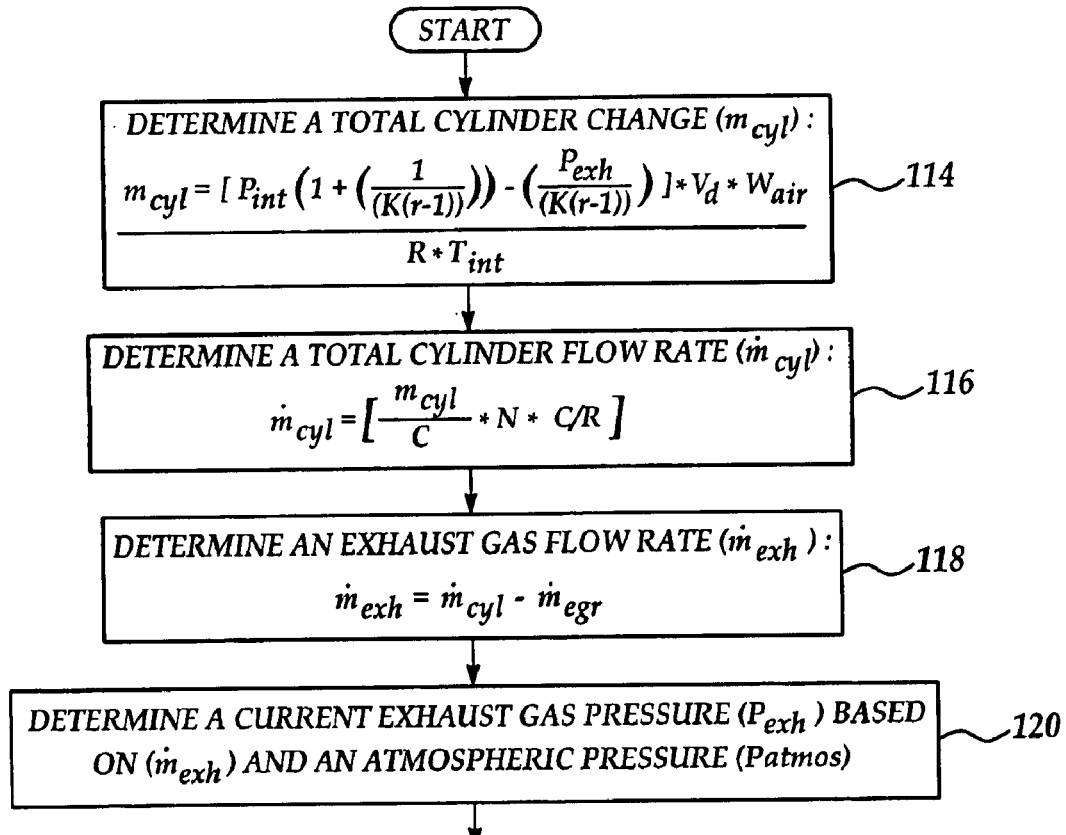

Referring to FIG. 6B, at step 114, a total cylinder charge ($m_{cyl}$) is determined using the following equation:

$$m_{cyl} = \eta_0 \frac{\left[ P_{int}\left(1 + \frac{1}{K(r-1)}\right) - P_{exh}\left(1 + \frac{1}{K(r-1)}\right) \right] V_d W_{air}}{RT_{int}}$$

where $\eta_0$=dimensionless scale factor to account for non-ideal behavior;

$P_{int}$=pressure in intake manifold 38;

K=(specific heat of air-fuel mixture at constant pressure/specific heat of mixture at a constant volume);

r=compression ratio in the engine cylinder;
$V_d$=displacement volume of the engine cylinder;
$W_{air}$=molecular weight of air
R=Ideal Gas Law Constant
$T_{int}$=temperature in intake manifold 38.

Next at step 116, the total cylinder mass flow rate ($\dot{m}_{cyl}$) flowing through the engine over a standard time interval is determined from the total charge per cylinder ($m_{cyl}$) and engine speed N. Using 1 minute as the standard time interval, the total cylinder mass flow rate can be determined using the following equation:

$$\dot{m}_{cyl} = \frac{2 \cdot NUMCYL}{S} N m_{cyl}$$

where,
NUMCYL=number of engine cylinders operating;
N=engine speed (revolutions/minute)
S=number of strokes per engine cycle (2 or 4).

Next at step 118, the exhaust gas flow rate ($\dot{m}_{exh}$) is determined using the following equation:

$$\dot{m}_{exh} = \dot{m}_{cyl} - \dot{m}_{egr}$$

where,
$\dot{m}_{cyl}$=mass flow rate of gas flowing through the engine cylinder over a standard time interval, described earlier;
$\dot{m}_{egr}$=mass flow rate of EGR being recirculated into the intake manifold 38 over a predetermined time interval.

Figure 2:
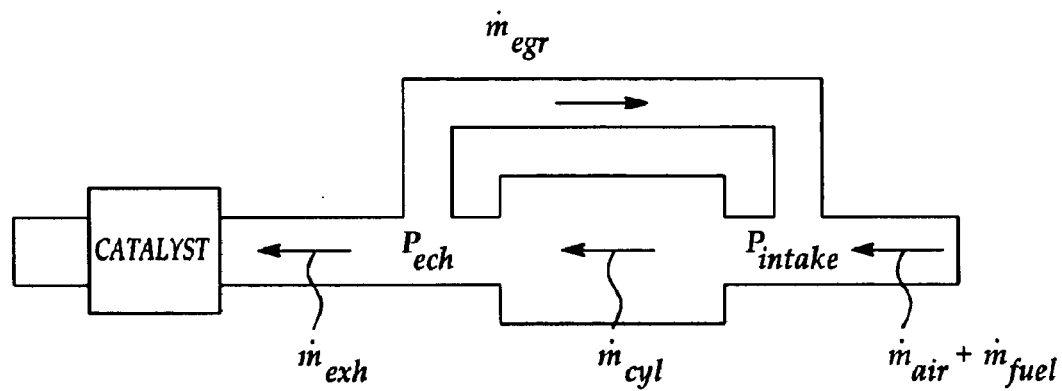
FIG. 2 is a simplified engine diagram illustrating the flow of gases through an engine.

Referring to FIG. 2, a schematic of an engine is provided showing the various flow rates therethrough. As shown, the cylinder gas flow rate ($\dot{m}_{cyl}$) is equal to the sum of exhaust gas flow rate ($\dot{m}_{exh}$) and the EGR flow rate ($\dot{m}_{egr}$). Accordingly, the earlier equation can be derived from this relationship.

Figure 5:
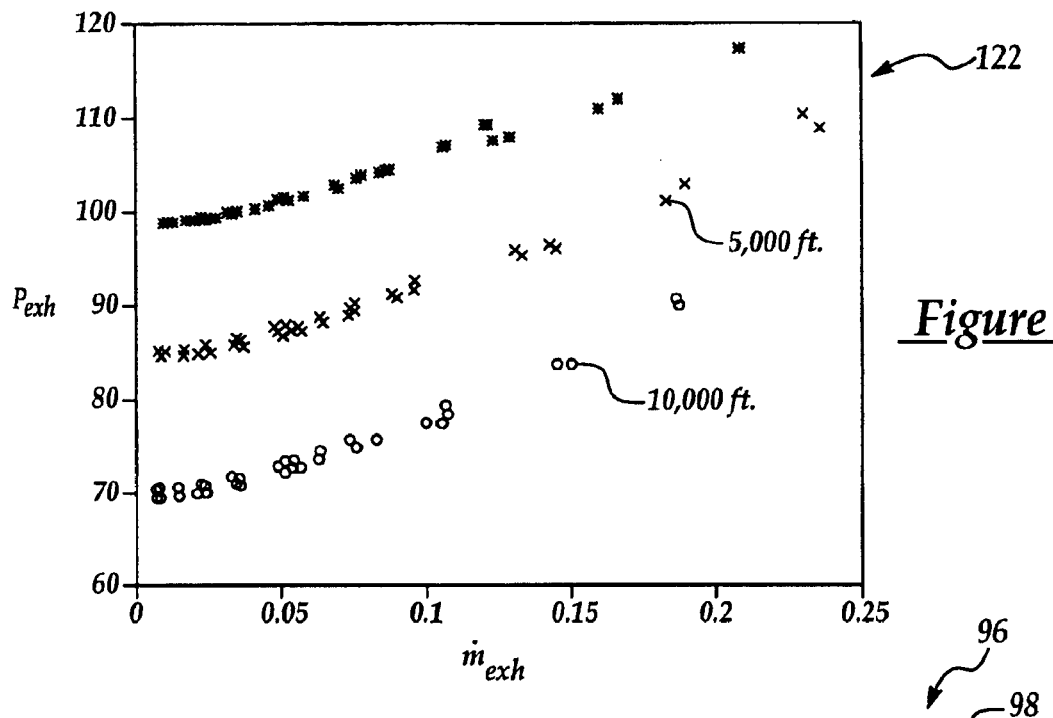
FIG. 5 is a graph illustrating the relationship between the exhaust gas flow rate ($\dot{m}_{exh}$) and the exhaust gas pressure ($P_{exh}$).

Next at step 120, the current exhaust gas pressure ($P_{exh}$) is determined from the exhaust gas flow rate ($\dot{m}_{exh}$) and an atmospheric pressure ($P_{atmos}$). The pressure ($P_{atmos}$) can be determined from a pressure sensor (not shown) communicating with atmospheric pressure and transmitting a signal to controller 58. Alternately, the pressure ($P_{atmos}$) could be inferred from a vehicle altitude determined from GPS positional signals. The GPS positional signals could be received by a GPS receiver (not shown) operably communicating with controller 58. Referring to FIG. 5, if the vehicle altitude and exhaust gas flow rate ($\dot{m}_{exh}$) are known, a lookup table 122—which is graphically illustrated—can be used to determine ($P_{exh}$). For example, if the exhaust gas flow rate ($\dot{m}_{exh}$)=0.2 and the altitude of vehicle 10 is approximately 10,000 feet above sea level, the exhaust gas pressure would be about 90 kiloPascals.

Referring again to FIG. 6A, after step 98, the method advances to step 100. At step 100, a change in exhaust gas recirculation percentage ($\Delta$ % EGR) from a nominal base value corresponding to the base spark advance setting is determined. As discussed above, the exhaust gas recirculation percentage (% EGR) is defined by the following equation:

$$\% EGR = 100 \times \frac{\dot{m}_{egr}}{\dot{m}_{egr} + \dot{m}_{air}}$$

($\Delta$ % EGR) is a change in the % EGR value from the expected value % $EGR_{no\ min\ al}$ corresponding to a base ignition timing. The value $\Delta$ % EGR is determined using the following equation:

$$\Delta \% EGR = \% EGR_{actual} - \% EGR_{no\ min\ al}$$

where

% $EGR_{no\ min\ al}$=the nominal or base % EGR value corresponding to base spark timing
% $EGR_{actual}$=the actual % EGR value based on measured or inferred EGR mass flow rate.

Next at step 102, a change in an air-fuel ratio (AF) in the engine cylinder from a nominal desired value is determined using the following equation:

$$\Delta AF = AF_{actual} - AF_{no\ min\ al}$$

Next at step 104, a change in a combustion temperature rise ($\Delta T$) is determined based on the change in the exhaust pressure ($\Delta P_{exh}$), the change in the EGR percentage ($\Delta$ % EGR), and the change in the air-fuel ratio ($\Delta AF$).

To further explain step 104, the mathematical equations used to determine the change in the temperature rise will now be explained. The temperature rise ($\Delta T$) during combustion in a cylinder may be determined using the following equation:

$$\Delta T = \Delta T' \frac{\left(1 + \frac{1 - \frac{P_{exh}}{P_{int}}}{Kr}\right)\left(1 - \frac{\% EGR}{100}\right)}{AF + \left(1 + \frac{1 - \frac{P_{exh}}{P_{int}}}{Kr}\right)\left(1 - \frac{\% EGR}{100}\right)}$$

with $\Delta T'$ the normalized temperature rise in cylinder at Standard Atmospheric Pressure defined as:

$$\Delta T' = \frac{H_c}{C_{P_{exh}}}$$

where, $H_c$=heat of combustion of a given mass of a standard air-fuel mixture
$C_{P_{exh}}$=specific heat of exhaust at a constant pressure for that same mass of mixture.

A gradient ($\nabla(\Delta T)$) of the temperature rise is a vector that defines the direction of maximum possible variation of the temperature rise ($\Delta T$) due to changes in EGR, the exhaust pressure ($P_{exh}$), and the air-fuel ratio (AF). The gradient is defined by the following equation:

$$\nabla(\Delta T) = \frac{\partial \Delta T}{\partial \% EGR} \underline{i} + \frac{\partial \Delta T}{\partial P_{exh}} \underline{j} + \frac{\partial \Delta T}{\partial AF} \underline{k}$$

where $$\frac{\partial \Delta T}{\partial \% EGR}$$

is a partial derivative defining the change in temperature rise ($\Delta T$) due to a change in % EGR, and can be determined using the following equation:

$$\frac{\partial \Delta T}{\partial \% EGR} = \frac{\Delta T' \left(1 + \frac{1 - \frac{P_{exh}}{P_{int}}}{Kr}\right) AF}{\left[AF + \left(1 + \frac{1 - \frac{P_{exh}}{P_{int}}}{Kr}\right)\left(1 - \frac{\% EGR}{100}\right)\right]^2};$$

$$\frac{\partial \Delta T}{\partial P_{exh}}$$

is a partial derivative defining the change in temperature rise (ΔT) due to a change in $P_{exh}$, and can be determined using the following equation:

$$\frac{\partial \Delta T}{\partial P_{exh}} = \Delta T' \frac{\frac{-AF}{P_{int}Kr}\left(1 - \frac{\% EGR}{100}\right)}{\left[AF + \left(1 + \frac{1 - \frac{P_{exh}}{P_{int}}}{Kr}\right)\left(1 - \frac{\% EGR}{100}\right)\right]^2}; \text{ and,}$$

$$\frac{\partial \Delta T}{\partial AF}$$

is a partial derivative defining the change in temperature rise (ΔT) due to a change in the air-fuel ratio AF, and can be determined using the following equation:

$$\frac{\partial \Delta T}{\partial AF} = \Delta T' \frac{-\left(1 + \frac{1 - \frac{P_{exh}}{P_{int}}}{Kr}\right)\left(1 - \frac{\% EGR}{100}\right)}{\left[AF + \left(1 + \frac{1 - \frac{P_{exh}}{P_{int}}}{Kr}\right)\left(1 - \frac{\% EGR}{100}\right)\right]^2};$$

The vector (Δ) that defines how the values (% EGR), ($P_{exh}$), and (AF) are simultaneously changing is described by the following equation:

$$\Delta = \Delta \% EGR\underline{i} + \Delta P_{exh}\underline{j} + \Delta AF\underline{k}$$

Thus, the change in combustion temperature rise δ(ΔT) can be due to changes in % EGR, $P_{exh}$, and the AF ratio can be determined by the following dot product equation:

$$\delta(\Delta T) = \nabla(\Delta T) \cdot \Delta$$

Referring again to FIG. 6A, after step 104, the method advances to step 106 which determines a base ignition timing value ($IT_0$) from engine operating conditions. In particular, controller 58 can determine ignition timing value ($IT_0$) by accessing a lookup table of ignition timing values indexed by engine speed and air mass (AM), with the nominal value % $EGR_{nominal}$ assumed.

Next at step 108, an ignition timing adjustment value (δIT) is determined from a change in the combustion temperature rise (ΔT) using the following equation:

$$\delta IT = G^* \delta(\Delta T)$$

where G is a gain defined by the following equation:

$$G = \frac{AF}{\Delta T' \left(1 + \left(1 - \frac{Pexh}{Pint}\right)/Kr\right)};$$

and δ(ΔT) is a change in the combustion temperature rise as discussed above.

Next at step 110, a desired ignition timing value (IT) is determined using the following equation:

$$IT = IT_0 + \delta IT$$

Next at step 112, the ignition timing in an engine cylinder is controlled based on the desired ignition timing value (IT).

The system 14 and method for controlling ignition timing provides a substantial advantage over conventional systems and methods. In particular, the system and method allows vehicles to have optimal ignition timing at either relatively high altitudes or sea-level altitudes. This advantage is obtained because the contribution of a change in EGR, a change in exhaust pressure ($P_{exh}$), and a change in air-fuel ratio (AF) are each directly related to change in temperature rise in an engine cylinder. Thus, extremely accurate control of ignition timing can result since the temperature rise in a cylinder is directly correlated to an ignition timing adjustment value used to adjust ignition timing.

I claim:

1. A method for controlling ignition timing of a cylinder, said cylinder in an engine having at least one cylinder, comprising:

determining a change in a combustion temperature rise for a combustion event, in said cylinder, based at least on a change in exhaust pressure; and adjusting said ignition timing of said cylinder based on said change of combustion temperature rise determined for said combustion event, in said cylinder.

2. The method of claim 1 wherein said change in combustion temperature rise for a combustion event is further based on an exhaust gas recirculation rate of exhaust gases into an intake manifold communicating with said cylinder.

3. The method of claim 1 wherein said change in a combustion temperature rise for a combustion event is further based on an air-fuel ratio of said cylinder.

4. The method of claim 1 wherein said step of adjusting said ignition timing includes:

determining a base ignition value based on an engine operating condition;

determining an adjustment ignition value from said change of combustion temperature rise for a combustion event in said cylinder; and, determining a commanded ignition timing value based on said base ignition value and said adjustment ignition value.

5. A method for controlling ignition timing of a cylinder, said cylinder in an engine having at least one cylinder, comprising:

determining a change in a combustion temperature rise for a combustion event, in said cylinder, based at least on a ratio of exhaust manifold pressure to intake manifold pressure; and adjusting said ignition timing of said cylinder based on said change of combustion temperature rise determined for said combustion event, in said cylinder.

6. The method of claim 5 wherein said change in combustion temperature rise in said cylinder is further determined from a change in an amount of exhaust gas recirculation into an intake manifold of said engine communicating with said cylinder.

7. The method of claim 5 wherein said step of adjusting said ignition timing includes:
   determining a base ignition value based on an engine operating condition;
   determining an adjustment ignition value from said change of combustion temperature in said cylinder; and
   determining a commanded ignition timing value based on said base ignition value and said adjustment ignition value.

8. A system for controlling ignition timing of a cylinder within an engine, said engine having an intake manifold communicating with the cylinder, comprising:
   an ignition coil coupled to a spark plug for delivering spark to said cylinder;
   a sensor for determining an engine operating parameter; and
   a controller to command at least a spark from said ignition coil coupled to said spark plug, said controller configured to determine a change in a combustion temperature rise within said engine based at least on a change in exhaust pressure, said controller further configured to adjust said ignition timing, delivered to said cylinder by said ignition coil, based on said change of combustion temperature rise.

9. The system of claim 8 wherein said sensor is coupled to said engine, said sensor used to determine at least an engine operating condition, said sensor in communication with said controller, said controller further determining a change in combustion temperature rise within said cylinder based on said engine operating condition.

10. The system of claim 9 wherein said sensor comprises an exhaust gas sensor disposed downstream of said engine cylinder and said engine operating parameter is an air-fuel ratio.

11. The system of claim 9 wherein said sensor comprises a flow sensor positioned in a conduit communicating exhaust gases between an exhaust manifold and an intake manifold, and said engine operating parameter is an exhaust gas flow rate.

12. An article of manufacture, comprising:
    a computer storage medium having a computer program encoded therein for controlling ignition timing of an engine, said engine having an engine cylinder, said computer storage medium comprising:
    code for determining a change in a combustion temperature rise within at least a cylinder of said engine based at least on a change in exhaust pressure; and
    code for adjusting said ignition timing of said cylinder based on said change of combustion temperature rise.

13. The article of manufacture of claim 12 wherein said code for determining a change in combustion temperature rise further includes code for determining said change in combustion temperature rise based on an exhaust gas recirculation rate of exhaust gases into an intake manifold communicating with said engine cylinder.

14. The article of manufacture of claim 12 wherein said code for determining a change in combustion temperature rise further includes code for determining said change in combustion temperature rise based on a ratio of intake manifold pressure to exhaust manifold pressure.

15. The article of manufacture of claim 12 wherein said code for determining a change in combustion temperature rise further includes code for determining said change in combustion temperature rise based on an air-fuel ratio of said cylinder.

16. The article of manufacture of claim 12 wherein said code for adjusting said ignition timing includes:
    code for determining a base ignition value based on an engine operating condition;
    code for determining an adjustment ignition value from said change of combustion temperature in said cylinder; and
    code for determining a commanded ignition timing value based on said base ignition value and said adjustment ignition value.

* * * * *